United States Patent [19]

Chien et al.

[11] Patent Number: 5,627,882
[45] Date of Patent: May 6, 1997

[54] ENHANCED POWER SAVING METHOD FOR HAND-HELD COMMUNICATIONS SYSTEM AND A HAND-HELD COMMUNICATIONS SYSTEM THEREFOR

[75] Inventors: Cheng-Tung Chien, Chungho; Chang-Wen Chen; Chiu-Hong But, both of Taipei, all of Taiwan

[73] Assignee: U.S. Philips Corporation, New York, N.Y.

[21] Appl. No.: 249,428

[22] Filed: May 26, 1994

[30] Foreign Application Priority Data

Jun. 2, 1993 [EP] European Pat. Off. .............. 93201584

[51] Int. Cl.⁶ ..................................................... H04Q 7/18
[52] U.S. Cl. ..................... 379/61; 340/825.44; 455/38.3; 455/161.1
[58] Field of Search .................................. 379/61, 58, 59; 455/38.3, 127, 343, 161.1, 161.2; 340/825.44

[56] References Cited

U.S. PATENT DOCUMENTS

| | | | |
|---|---|---|---|
| 5,023,932 | 6/1991 | Wakana | 455/34 |
| 5,128,938 | 7/1992 | Borras | 370/95.1 |
| 5,197,093 | 3/1993 | Knuth et al. | 379/61 |
| 5,262,769 | 11/1993 | Holmes | 340/825.03 |
| 5,301,225 | 4/1994 | Suzuki et al. | 379/59 |

FOREIGN PATENT DOCUMENTS 0490441  6/1992  European Pat. Off. ......... H04Q 7/04

*Primary Examiner*—Curtis Kuntz
*Assistant Examiner*—Nay Aung Maung
*Attorney, Agent, or Firm*—Arthur G. Schaier

[57] ABSTRACT

An enhanced power saving method for operating a battery powered hand-held communication system, particularly a cordless phone system, and the communication system constructed in accordance with the power saving method are described. The power saving method consists of an algorithm which divides the standby time of the communication system into a scanning mode and a sleep mode having several different levels to allow the system to enter the scanning mode intermittently. Each level of the sleep mode corresponds to a given length of delay time between two successive scanning periods. The communication system enters different levels of the sleep mode in accordance with the standby time history. The more standby time that passes, the longer the sleep time for the level that the system may enter. This reduces the scan rate when the system is not used for a long period.

6 Claims, 5 Drawing Sheets

5,627,882

ENHANCED POWER SAVING METHOD FOR HAND-HELD COMMUNICATIONS SYSTEM AND A HAND-HELD COMMUNICATIONS SYSTEM THEREFOR

BACKGROUND OF THE INVENTION

1. Field of the Invention

The present invention relates generally to a battery powered hand-held communication system, such as a cordless phone system and a mobile phone system, and in particular to an enhanced power saving method for operating the battery powered communication system in an enhanced power saving standby mode in which the receiver of the communication system changes the scan rate as a function of the standby time and enters a sleep mode if no incoming signal is received or no outgoing signal is transmitted in order to save on power consumed by the receiver.

The invention is also directed to an enhanced power saving cordless communication system which comprises a controller changing the scan rate of the receiver as a function of the standby time in order to minimize the power consumed in the standby interval.

2. Brief Discussion of Prior Art

Prolonging the standby time of a battery powered cordless communication system, especially a hand-held cordless communication system, is a challenge to the communication industry. A hand-held cordless communication system includes, in general, a receiver for incoming signals and a transmitter for outgoing signals. For a conventional hand-held cordless communication system, its operation is divided as a talk mode TM in which both the receiver and the transmitter are active and a standby mode in which the transmitter is inactive with the power supplied thereto completely cut off while the receiver remains in an active mode so as to scan for incoming signals from the surrounding air.

For a conventional cordless phone system, the power consumptions of the transmitter and the receiver thereof are respectively illustrated in FIGS. 1 and 2 of the attached drawings. As illustrated in FIG. 1, the transmitter consumes no power at all in the standby mode. However, as shown in FIG. 2, the receiver takes the same amount of power in both the talk mode and the standby mode since it maintains itself in an active mode. As a result, the overall system power consumption of the conventional hand-held cordless communication system is generally the sum of FIGS. 1 and 2, which sum is illustrated in FIG. 3.

An interpretation of FIGS. 1, 2 and 3 indicates that in the talk mode, both the transmitter and the receiver consume power, while in the standby mode, only the receiver takes power to maintain the active mode. Since the receiver has to be maintained in the active mode, power supplied thereto cannot be cut off. Such a system requires a substantial power consumption to maintain the receiver in the active mode all of the time. Since the incoming signals are coming in a random fashion, maintaining the receiver in the active mode represents quite a loss from the point of view of power-saving.

Another type of the hand-held cordless communication system uses a software algorithm to control the power supply. In a communication system of this kind, the power supply to the transmitter is the same as previously discussed, i.e., power is only consumed in the talk mode. However, the power supply to the receiver is made intermittent, as shown in FIG. 4.

In the communication system illustrated in FIG. 4, the standby mode contains a scanning mode when the receiver is active to scan for incoming signals and a sleep mode when the receiver is deactivated and the power supplied thereto is completely cut off. In the scanning mode, the receiver is powered to scan for incoming signals from the surrounding air within a predetermined period. Once no incoming signal is detected in this predetermined period, the power is shut down and the receiver enters the sleep mode. The receiver will sleep for a given fixed sleeping period and is then activated to enter the scanning mode again. This procedure will be continuously repeated unless a call is made. Apparently, the power is completely cut off to both the receiver and the transmitter in the sleep mode. Normally, the scanning period, namely the predetermined period within which the receiver is activated to scan for incoming signals, is approximately 1/5 or 1/10 of the sleeping period of the sleep mode which, as can be understood, is the time interval between two successive scan modes.

In the above-mentioned conventional power saving communication system, the scan rate, which is used herein to denote the number of the scan modes occurring in a given length of time in the standby mode, is fixed. This kind of system does provide a significant reduction in the overall power consumption, as illustrated in FIG. 5.

The conventional power saving communication system, although effective in cutting down on power consumption, still wastes a great deal of power in the standby mode, especially during the night when the communication system is generally not used for a very long while.

Due to the development of the even smaller and lighter battery powered hand-held communication system, the power consumption will be subject to a more severe restriction. Thus, a more effective algorithm is desired to handle these more severe requirement of power consumption for the battery powered hand-held cordless communication systems.

In the current cordless phone market, one of the most advanced systems is the so-called multiple channel access (MCA) auto-scan cordless phone which includes a base powered by an external power source and a battery powered handset with a multiplicity of electromagnetic link channels connecting these two parts. The MCA auto-scan cordless phone, as implied by the name, scans all of the multiple link channels to seek and establish the best communication between the base and the handset.

To meet the requirement of the end users, the MCA auto-scan cordless phone system has to provide a fast but power efficient link between the base and the handset to meet PTT regulations and to prolong the overall operation time that the battery in the handset can provide. To be fast, a high data rate of communication should be established between the base and the handset and, as known to the art, PTT regulations should be followed regarding the data rate. The requirement of high data rate can be solved by using high speed modulating/demodulating techniques, such as 1200 or 2400 bps (baud per second) modem chips. An example of a known circuit, which adopts the high speed modulating/demodulating technique, is illustrated in FIG. 6, which arrangement was proposed by the SONY company. The circuit in FIG. 6 includes a modulating/demodulating device with the speed of 1200 bps 61 to process the signals communicated between the base and the handset, e.g., an MSK modem. The signals after modulation/demodulation are transmitted by a transmitter 63 via a audio control circuit 62. In standby mode, the receiver 64 scans the signals of the multiple channels with a fixed scanning rate. Further shown are a duplexer 65, a synthesizer 66, and an antenna 67, voice $V_o$ and data $D_a$ signals being present.

Although the high speed modulating/demodulating technique provides a high data rate, the power saving problem is still not overcome. The power saving problem is very severe for the MCA auto-scan cordless phone because (1) it is powered by a limited battery power source and (2) it takes a great deal of power to scan all of the channels continuously. The conventional power saving algorithm, as discussed above, has been widely used to resolve the power saving problem so as to prolong the overall standby time provided by a battery set. As discussed previously, such a conventional power saving algorithm is not very effective and thus it is desirable to have a more effectual power saving method to further prolong the standby time that a battery can provide.

SUMMARY OF THE INVENTION

It is therefore an object of the present invention to provide a power saving method for a battery powered communication system, which method greatly reduces the power consumption of the receiver of the battery powered communication system during the standby mode of operation by changing the incoming signal scan rate as a function of the standby time history.

In accordance with a first aspect of the present invention, a power saving method for a cordless communication system, especially a battery powered cordless phone, is provided. According to the proposed power saving method, the scan rate is no longer fixed but changes as a function of the standby time. This provides a more efficient utilization of the battery power, especially during the time when the phone is used less frequently, e.g., during the night. The scan rate is gradually reduced step by step with the standby time when the phone is not operated for a long while and the system will be restored to the original scan rate once an in-coming call is received or an outgoing call is attempted. As compared with the conventional fixed scan rate method, the present method does provide a better way in saving the battery power.

It is also an object of the present invention to provide an enhanced power saving architecture for an MCA auto-scan cordless phone system which, by adopting the power saving algorithm of the present invention, greatly reduces the power consumption in scanning the incoming signals through all the channels.

It is another object of the present invention to provide a power saving architecture for an MCA autoscan cordless phone, comprising a decoder circuit which allows the central processing unit (CPU) of the phone to "sleep" until a special identification code carried by the incoming signal is matched so as to reduce power consumption.

According to another aspect of the present invention, an MCA auto-scan cordless phone architecture is provided. The MCA auto-scan cordless phone architecture comprises a decoder operating in a principle similar to the decoder of a pager system. The basic composition of the pager system is shown in FIG. 7. The pager system comprises a decoder 72 to determine if the signal received by a receiver 71 of the pager is the one to be received by the pager by checking if the detected signal carries an address matching that pre-set in the pager decoder. Once the received signal matches the address of the pager system, the pager will enable a microcontroller 73 to activate a beep or a display 75 according to the data pre-stored in a user interface 74 to inform the user of the incoming signal. A similar principle is adopted in the MCA auto-scan cordless phone architecture provided by the instant invention in that the decoder of the cordless phone checks the address or identification code of other kinds carried by a signal detected by the receiver of the phone. Once the address or identification code is accepted, the decoder "wakes up" the sleeping CPU to perform signal receiving.

According to a further object of the present invention, the MCA auto-scan cordless phone has a receiver to scan and receive signals from the surrounding air operated by a scanning procedure programmed in accordance with the enhanced power saving algorithm of the present invention.

BRIEF DESCRIPTION OF THE DRAWINGS

Other objects and advantages of the invention will be apparent from the following description of preferred embodiments taken in connection with the accompanying drawings, wherein.

DETAILED DESCRIPTION OF PREFERRED EMBODIMENTS

An enhanced power saving communication system constructed in accordance with the present invention comprises a receiver to receive incoming signals and a transmitter to send out outgoing signals with a cordless electromagnetic link therebetween to exchange link data with each other. The operation of the communication system is divided into a TALK MODE TM in which both the transmitter and the receiver are active to enable the receipt and transmission of signals and data and a STANDBY MODE SBM in which the transmitter is deactivated to minimize power consumption and the receiver is repeatedly activated and deactivated in an intermittent fashion. The STANDBY MODE period is thus further divided into SCANNING MODE in which the receiver is active for scanning the incoming signals for a given scanning period and SLEEP MODE in which the receiver is deactivated to further reduce power consumption.

Figure 8:
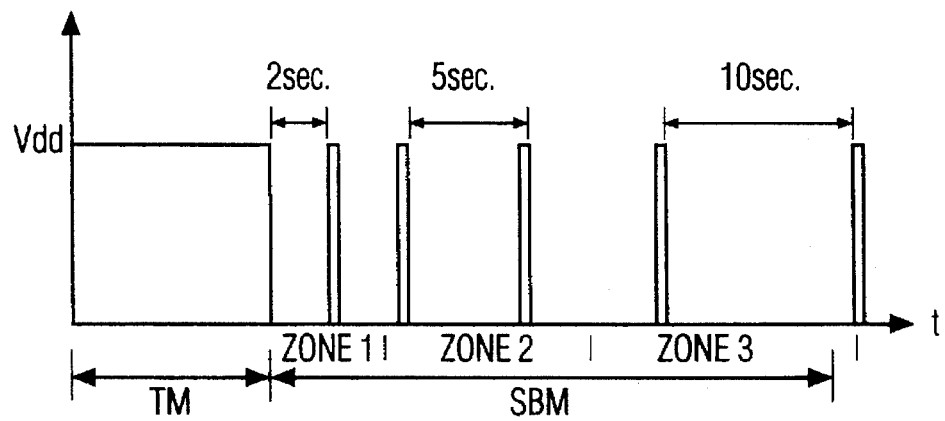
FIG. 8 is a plot of the supplied power needed in operation by a receiver of an enhanced power saving communication system in accordance with the present invention.

With reference to the drawings and in particular to FIG. 8, wherein a power supplying curve of the enhanced power saving cordless communication system constructed in accordance with the present invention and operated in accordance with the power saving method of the present invention is illustrated, it will be observed that the scan rate of the receiver is activated to scan the incoming signals per unit time is changing in accordance with the standby time history. Namely, the scan rate is no longer fixed as in the conventional cordless phone systems but is now a function of the standby time.

The purpose of changing the scan rate in accordance with the standby time is to cut down the scan rate when the communication system is used less frequently, e.g., at night, and to increase the scan rate when the communication system is used more frequently, e.g., during the day time.

An example of changing the scan rate with the standby time is illustrated in FIG. 8 wherein the standby time is divided into different time zones by, for example, two hours, the first one being 0–2 hour, the second one 2–4 hour, the third one 4–6 and so on. In each of the time zones, a different delay level in scanning operation is set, for example, in the 0–2 time zone, the scanning is carried out every two seconds with a 400 ms scanning period. In the next (2–4) time zone, scanning is conducted at every 5 seconds with the same scanning period. The scanning is carried out at every 10 seconds for the third (4–6) time zone. Once an incoming call is picked up or an outgoing signal is attempted, the whole system will be reset to interrupt the above procedure and restart the delay procedure using the first time zone.

Figure 9:
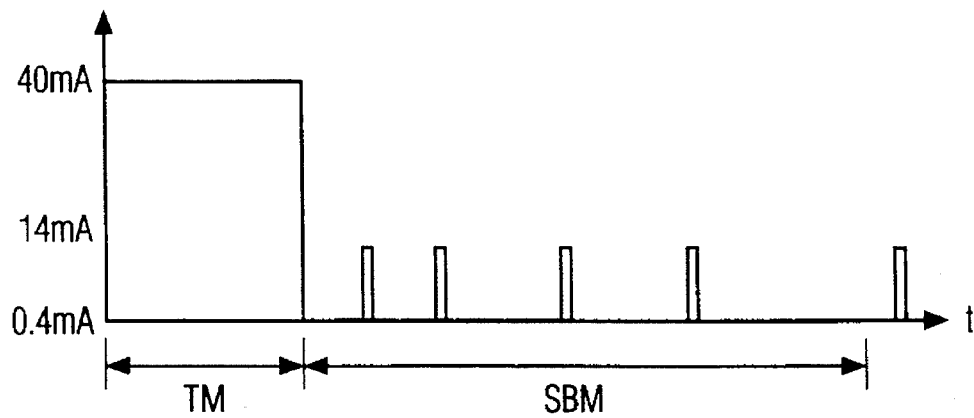
FIG. 9 is a plot showing the total power consumption of both the transmitter and the receiver of the enhanced power saving communication system in accordance with the instant invention.

The power consumption obtained in accordance with the above delay mode is plotted in FIG. 9. By comparing the plot of FIG. 9 with those of FIGS. 3 and 4, it will be observed that not only is the power consumption intermittent, but the average time interval (delay time) between two successive scanning periods is also increased. This indicates a further reduction in overall power consumption.

Figure 10:
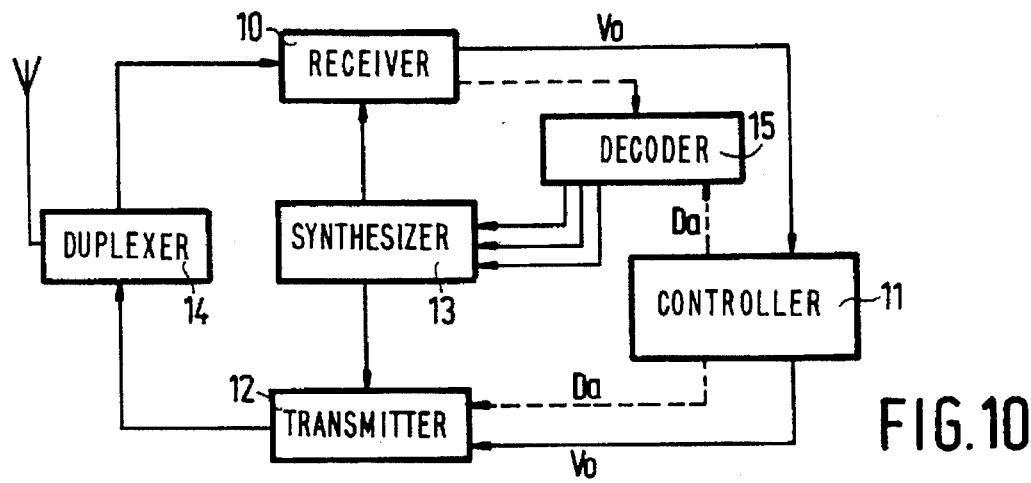
FIG. 10 is a block diagram of a preferred embodiment of the enhanced power saving communication system in accordance with the present invention.

As mentioned above, an application of the enhanced power saving method of the instant invention is an MCA auto-scan cordless phone. This is illustrated by an embodiment shown in FIG. 10. The phone system shown in FIG. 10 consists of a receiver 10, an audio and control device 11, a transmitter 12, a synthesizer 13, and a multiplexer or duplexer 14. To increase the data rate between the base and the handset (both not shown) of the phone system and to reduce power consumption, a cordless decoder 15 is connected between the receiver and the audio and control device 11. The cordless decoder 15 is operated in accordance with a principle similar to that of well-known pager systems for checking if the address or identification code carried by a detected incoming signal matches a built-in address or identification code within the system. Only when the incoming and the built-in addresses match is the incoming signal sent to the audio and control device 11 and then applied to the transmitter after being processed.

Figure 11:
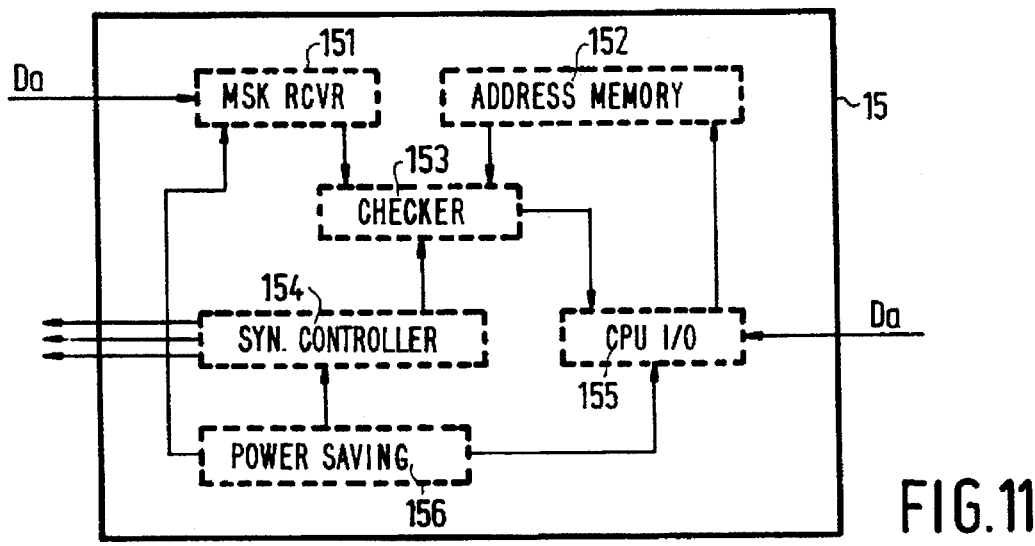
FIG. 11 is a block diagram of the cordless decoder of FIG. 10.

An exemplary circuit for the cordless decoder 15 is shown in FIG. 11, which include an MSK receiver 151 operated in accordance with the minimum shift keying (MSK) principle, a system address memory 152, an address checker 153, a synthesizer controller 154, a CPU interface 155, and a power saving circuit 156. When the signal coming to the system is received by the MSK receiver 151, the address carried by the signal is compared to the system address built into the memory 152 by the address checker 153. If the two addresses match, the CPU interface 155 will be woken up to receive the incoming signals, data or commands. The synthesizer controller 154 is to program the synthesizer 13 shown in FIG. 10 to different frequencies associated with different channels of the MCA auto-scan cordless phone system in order to receive and/or check the signals in all the channels of the system.

Although the cordless decoder 15 of the present invention is operated using a principle similar to that of known pager systems, it will be understood that they are different in that:

(1) the pager is an one-way communication device while the cordless phone is a bidirectional communication equipment;

(2) the pager decoder only needs to detect one fixed frequency and thus no synthesizer controller is required, while the MCA auto-scan cordless phone has to scan a number of frequency channels and thus needs a synthesizer controller; and (3) The power consumption of the MCA auto-scan cordless phone is much greater than pager system for the pager has a fixed frequency and the MCA auto-scan cordless phone has to scan a number of frequency channels and thus the power saving feature is extremely important in the MCA auto-scan cordless phone system. As a consequence, the pager system may not need to enter SLEEP MODE, namely both the receiver and the transmitter are off, while in the cordless phone, power saving algorithm is widely adopted.

Due to these differences between the pager decoder and the cordless decoder used in the instant invention, they are substantially different in the operation.

The power saving circuit, which is denoted by reference numeral 156 in FIG. 11, is a major feature of the present invention and will be described with reference to FIGS. 12 and 13 of the drawings. The power saving circuit 156 controls the operation of the CPU interface 155 to have the CPU follow the delay mode of scanning for incoming signals as described herein. In other words, the CPU of the system will be intermittently deactivated during the STANDBY MODE to save power and the length of the deactivated time of the CPU will change in accordance with the standby time of the system.

Figure 12:
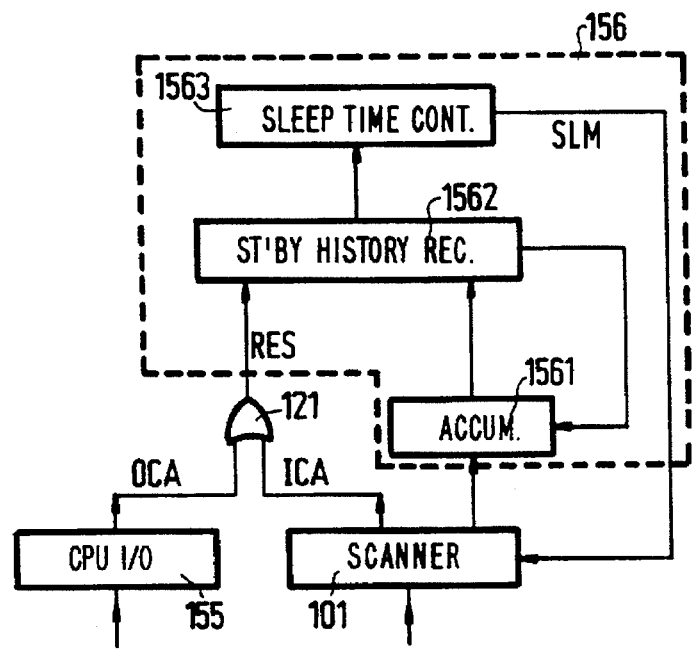
FIG. 12 is a block diagram of the power saving circuit of FIG. 11.

An example of the power saving circuit 156 is illustrated in a block diagram form in FIG. 12, in which the CPU interface 155 and a message scanner 101 of the receiver 10 are also shown for illustrating the relationship therebetween. The power saving circuit 156 may comprise an accumulator 1561, a standby history recorder 1562 and a sleep time controller 1563. Preferably, the accumulator 1561 is an up counter which counts the number of times that the receiver 10 carries out signal scanning during a period. The delay sequence is recorded in the standby history recorder 1562. The delay time and the associated scan rate are pre-built in the standby history recorder 1562. Once the count in the accumulator 1561 reaches the upper limit of a delay level, the standby history recorder 1562 will be triggered to enter the next delay level. Further shown is a reset-OR-gate 121, supplying a reset signal Res, on outgoing call OCA and incoming call ICA.

The sleep time controller 1563 is to set the sleep mode SLM of the system. The procedure for setting the sleep mode will be described with reference to the flow chart shown in FIG. 13. However, it should be understood that the flow chart of FIG. 13 is only an example of the inventive method and by no means serves to limit the scope of the present invention.

Figure 13:
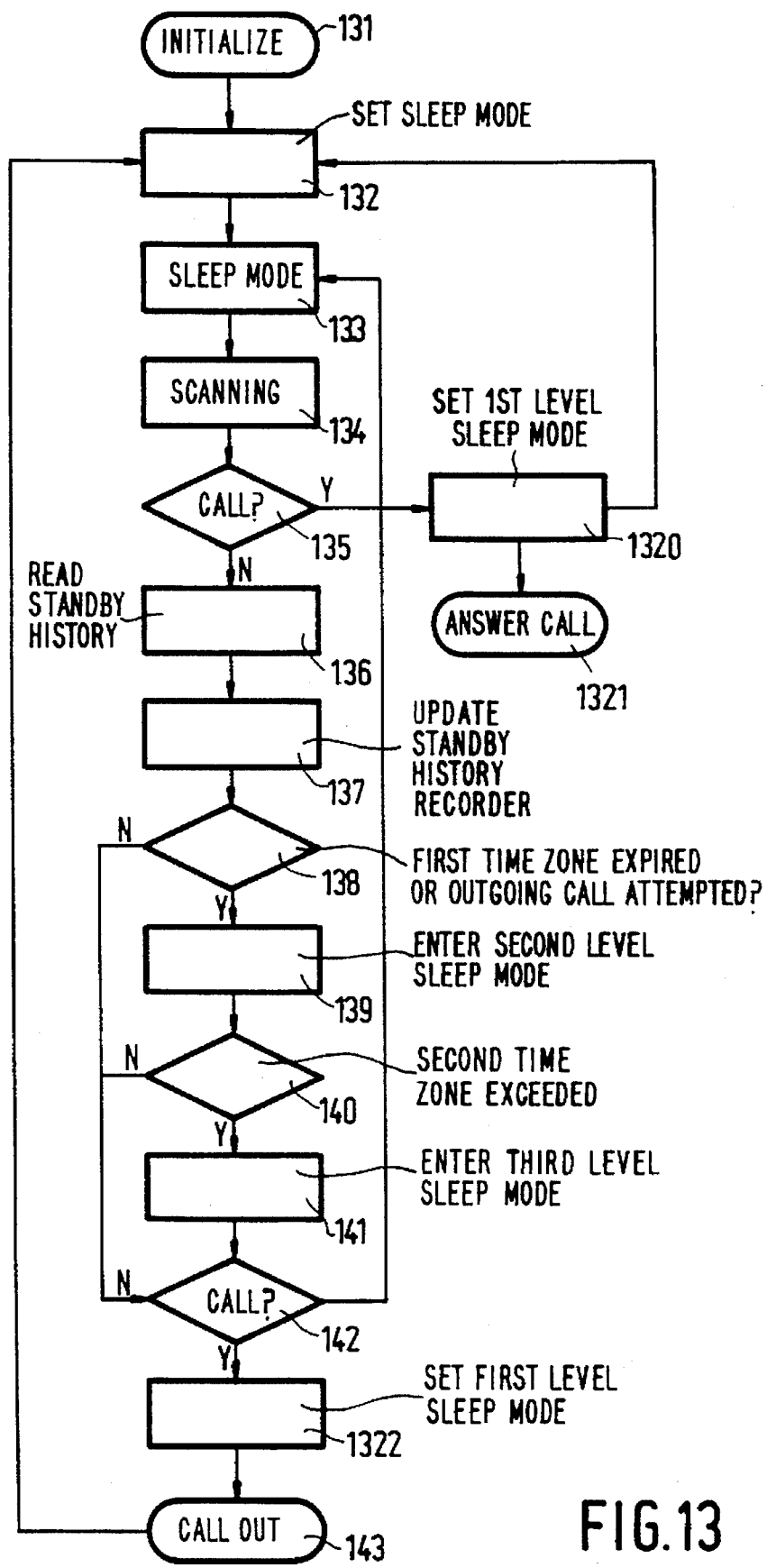
FIG. 13 is a flow chart illustrating the operation of the power saving circuit.

As shown in FIG. 13, the system starts with an initialization step 131 and then a step for setting the sleep mode to the first delay level thereof with the sleep time controller 1563 (step 132) and a step for entering the sleep mode (step 133). Thereafter at a suitable time in accordance with the setting of the sleep mode, the message scanner 101 of the receiver 10 is activated to enter the scanning mode, carrying out message scanning at step 134 to determine if a call is coming in at step 135. If yes, set the sleep mode to the first level again during step 1320 and the procedure jumps off to a being-all-subroutine at 1321 to pick up the incoming call. Thereafter, the procedure returns to step 133 to enter the first level sleep mode again.

If no incoming call is found at step 135, then the standby history is read from the standby history recorder 1562 at step 136 and an increase in the count of the accumulator 1561 by one with a subsequent updating of the standby history recorder is performed at step 137. The first delay level is continuously maintained until the first time zone which is associated with the first delay level and which is assumed to be 0-2 hours in an illustrated embodiment is ended or an outgoing call is made. This is checked at step 138. If the standby time does not exceed the limit of the first time zone, namely 2 hours from the beginning of the standby mode, the procedure will return to step 134 to conduct another message scanning after a suitable elapse of time determined by the delay time set by the first delay level via a checking of outgoing call at step 142.

At step 142, if no outgoing call is detected, the routing is directed back to step 134, otherwise it sets the sleep mode to the first level again at step 1322 and the procedure jumps off to a calling-subroutine at step 143 to make the outgoing call. Thereafter the procedure goes back to step 133 to enter the first level sleep mode again.

If it is determined at step 138 that the first time zone is exceeded, then at step 139 the system enters the second level of the sleep mode associated with the second time zone which in the illustrated example begins from the end of the second hour of the standby mode to the end of the fourth hour of the standby mode. Step 140 provides for checking whether the second time zone has been exceeded. This step is similar to step 138 associated with the first delay level and branches to either a checking of outgoing call at step 142 if the second time zone is not exceeded or a step of entering the third delay level of the sleep mode (step 141) if the second time zone is exceeded.

Step 141 is the step when the system enters the third delay level associated with the third time zone which is the time period between the ends of the fourth and the sixth hours of the standby mode in the illustrated embodiment. Step 141 provides a similar checking function as those of steps 138 and 140 associated with the first and the second delay levels.

It is understood that the setting of the time zone and the number of the total time zones may be different from what just described and it is intended to include all kinds of settings of the delay levels and the time zones in the spirit of the present invention.

An experiment with an MCA auto-scan cordless phone will be given as follows to show the unbelievable power saving capability of the present invention:

EXPERIMENT CONDITION

1. A 10 channel, 46/49 MHz auto-scan cordless phone handset;
2. MSK data transmission scheme at speed of 1200 bps;
3. Scanning time for all 10 channels: 400 ms;
4. Power consumption in TALK MODE: 40 mA;
5. Power consumption in SCANNING MODE: 14 mA;
6. Power consumption in SLEEP MODE: 0.4 mA; and
7. Battery capacity: 280 ma.hr.

EXPERIMENT RESULTS

Figure 1:
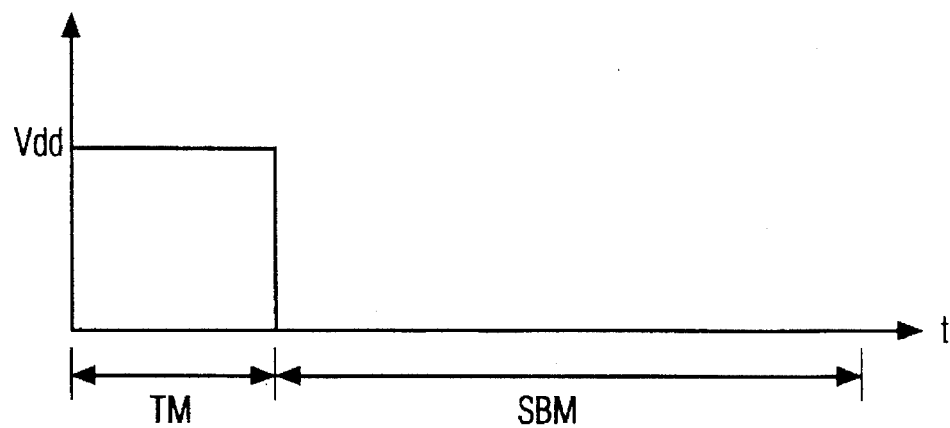
FIG. 1 is a plot of the supplied power needed in operation by a transmitter of a general cordless communication system.
Figure 2:
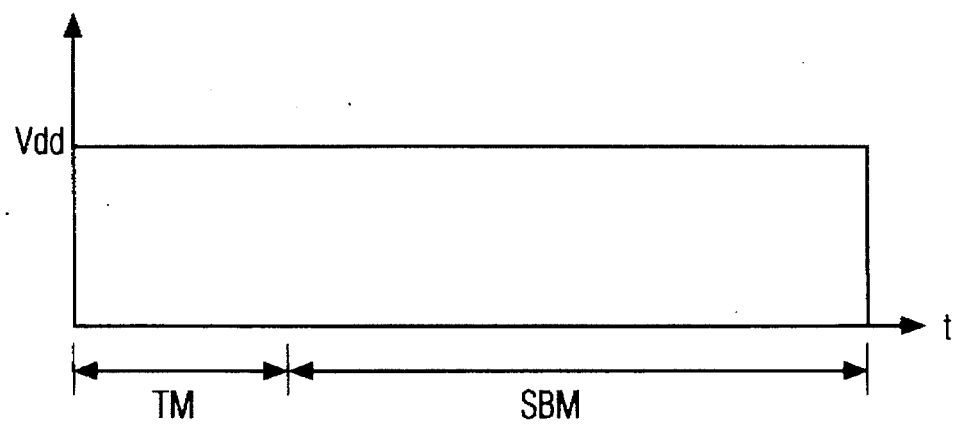
FIG. 2 is a plot of the supplied power needed in operation by a receiver of a general cordless communication system.
Figure 3:
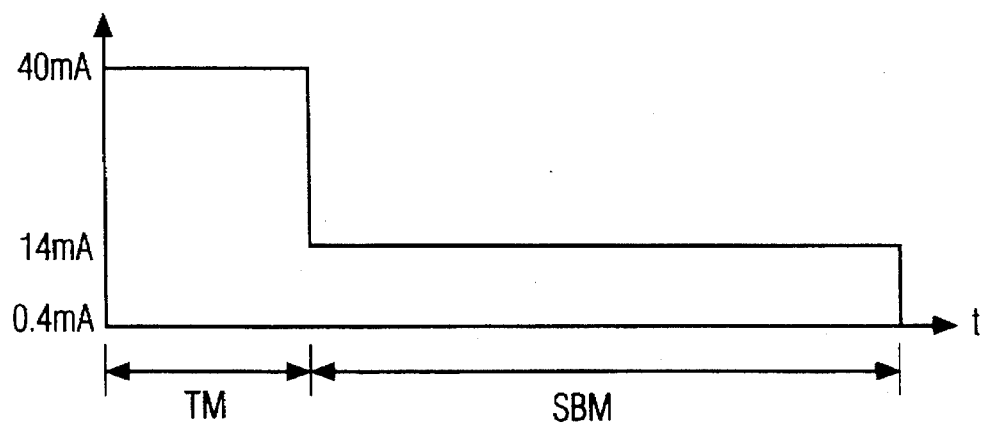
FIG. 3 is a plot showing the total power consumption of both the transmitter and receiver shown in FIGS. 1 and 2.
Figure 4:
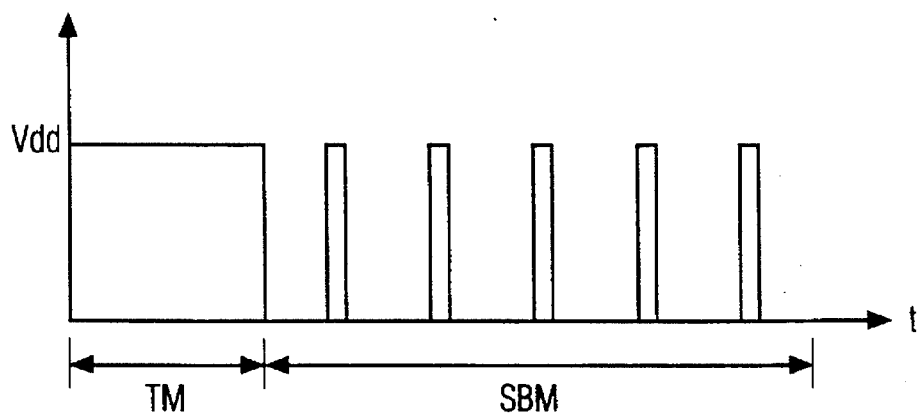
FIG. 4 is a plot of the supplied power needed in operation by a receiver of a conventional power saving communication system.
Figure 5:
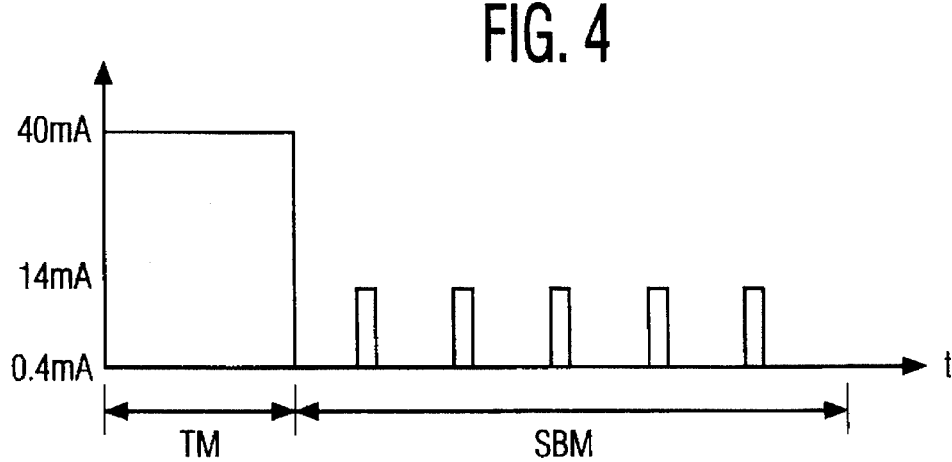
FIG. 5 is a plot showing the total power consumption of both the transmitter and receiver of the conventional power saving communication system.
Figure 6:
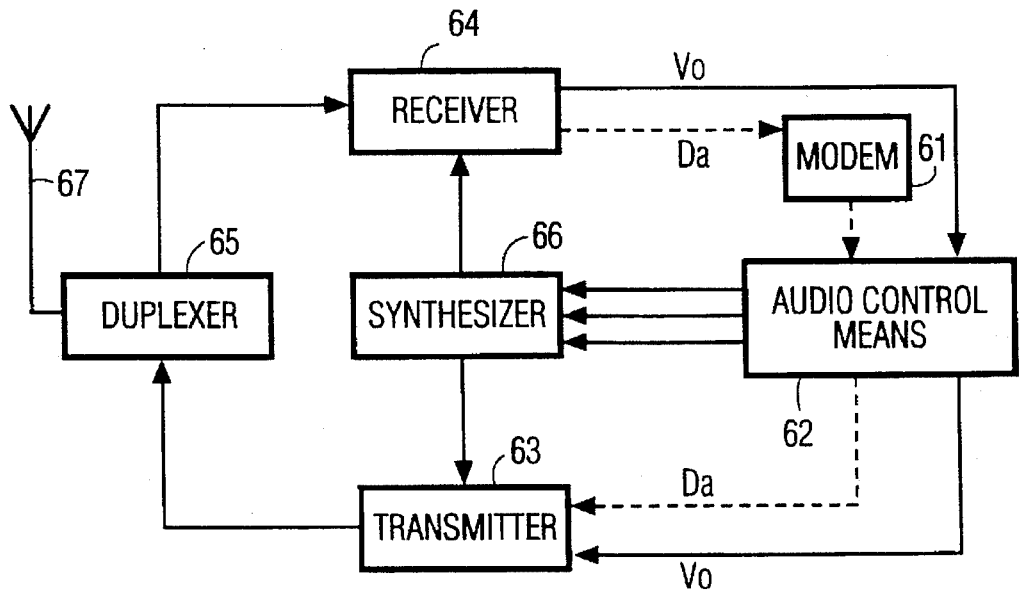
FIG. 6 is a block diagram of a conventional multiple channel access (MCA) auto-scan cordless phone system.
Figure 7:
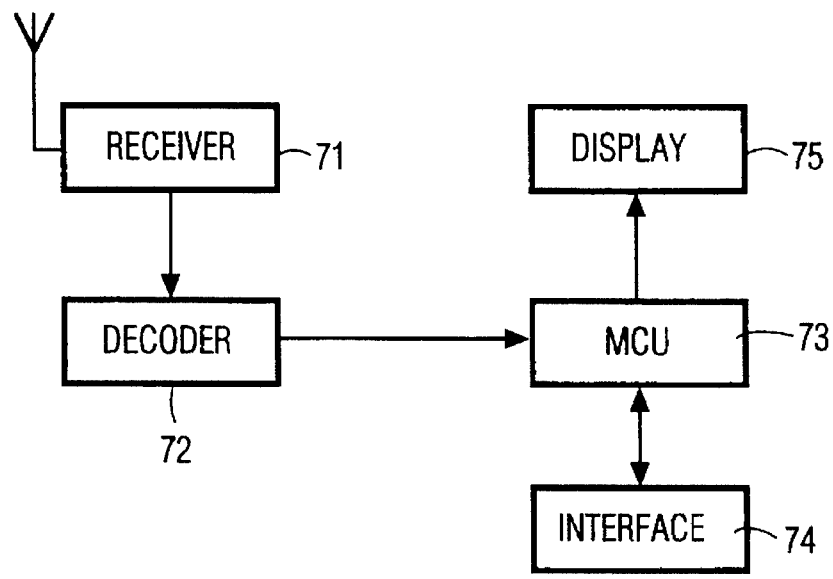
FIG. 7 is a block diagram of a pager system.

A. Non-power saving system, as illustrated in FIGS. 1-3:
 a. Continuous talk time: 7 hours;
 b. Continuous standby time: 20 hours; and
 c. Response delay to ring signal: one second.
B. Conventional power saving system, as illustrated in FIGS. 4 and 5:
 a. Continuous talk time: 7 hours;
 b. Continuous standby time: 105 hours; and
 c. Average response delay to ring signal: 1 second.
C. Enhanced power saving system of the present invention, as illustrated in FIGS. 8 and 9:
 a. Continuous talk time: 7 hours;
 b. Continuous standby time: 298.5 hours;
 c. Average response delay to ring signal:
  i. 1 second (<2 hours standby)
  ii. 2.5 seconds (2-4 hours standby)
  iii. 5 seconds (>4 hours standby).

From the above results, it is found that the standby time can be extremely prolonged from the 20 hours of the non-power saving system and the 105 hours of the conventional power saving system to the 298.5 hours of the present invention. The increasing is about 2-3 times of the conventional power saving system.

The only drawback is the slightly longer response delay to the first ring of an incoming call in the second and the third time zones. However, the delay is only approximately 3 ring tones (5 seconds) and it occurs only at the first incoming call after a long standby time. Once the first ring is detected, the system is restored to the most quick response mode so that the drawback is barely noticeable to the end users.

It is apparent that although the invention has been described in connection with the preferred embodiments, it is contemplated that those skilled in the art may make changes to certain features of the preferred embodiments without departing from the spirit and scope of the invention as defined in the appended claims.

We claim:

1. A power saving method for a cordless communication system wherein the cordless communication system comprises a receiver to scan and receive signals from a surrounding air, which receiver enters a period of a standby mode when no signal is coming in to be received thereby and which is activated to scan the signals from the surrounding air in accordance with preset scan rates and deactivated for a length of preset delay time to reduce power consumption in an alternate fashion within the standby mode period, said power saving method comprising:

dividing the standby period into a number of successive time zones;

establishing a delay level for each of said time zones, each delay level being associated with a delay time period;

setting a scan rate for each of said delay levels;

continuously allowing the receiver to be activated in accordance with the delay level and the scan rate associated with a current time zone of said time zones to establish a standby time history of the receiver;

recording the standby time history and comparing the standby time history with the definition of said time zones to determine which of said time zones the receiver is operating in;

updating the standby time history to allow the receiver to enter a next time zone next to the current time zone that the receiver was originally operating in so as to scan with the scan rate and to sleep for the delay time associated with the next time zone when the current time zone is exceeded; and repeating the comparing and updating procedures until being interrupted by an attempt to establish communication via the cordless communication system.

2. The method as claimed in claim 1, wherein the standby period is divided into at least three time zones of which a first time zone has the highest scan rate and the least delay time, a second time zone has an intermediate scan rate and an intermediate delay time and a third time zone has the lowest scan rate and the greatest delay time.

3. The method as claimed in claim 2, wherein said receiver is reset to the first time zone when the standby history is interrupted by an attempt to establish communication.

4. In a multiple channel access auto-scan cordless phone system having multiple channels controlled by a central processing unit, a wireless communication device comprising a decoding device for confirmation of signals received by the phone system comprising:

receiver means for receiving signals from the phone system;

memory means for storing therein an identification for each of the multiple channels of the phone system;

checker means for comparing a code carried by the signals with the identifications so that when the code matches with one of the identifications, an actuating signal is generated to wake up the central processing unit of the phone system to process the received signals;

a synthesizer controller which provides each of the multiple channels with a given communication frequency; and power saving circuit means for, when the phone system is in a standby mode for which a number of successive time zones are defined, providing the phone system with a corresponding number of different and time-based scan rates and delay time periods associated with the time zones to allow the phone to intermittently scan for the signals from the surrounding air in accordance with a respective one of the scan rates and to sleep for a period of a respective one of the delay times associated with a particular one of the time zones.

5. The wireless communication device as claimed in claim 4 wherein, said power saving circuit means comprises:

an accumulator for up-counting the number of signal scannings conducted by the phone system;

a standby history recorder which has the respective scan rates and the respective delay time periods for said time zones built therein to allow the phone system to enter a next time zone adjacent to said particular one of the time zones in response to the accumulator so as to change the operative scan rate and the operative delay time period in accordance with a counting result provided by the accumulator; and a sleep time controller for controlling the sleeping and scanning modes of the phone system during the standby mode in accordance with the time zones set in the standby history recorder.

6. In a power saving cordless communication system, comprising:

receiver means for scanning an incoming signal comprising at least an identification portion and an audio portion during a standby period of the system at a scan rate and receiving the incoming signal as a received signal, said standby period being divided into a number of successive time zones, the receiver means moving from a current time zone to a next time zone with time during the standby period;

decoding means for decoding and identifying the identification portion of the received signal;

audio and control means for processing the audio portion of the received signal and sending out the processed audio portion together with the identification portion; and transmitter means for transmitting outgoing signals; the improvement comprising an improved decoding means including:

identifying means for checking the identification portion of the received signal with an identification code associated with the system; and power saving means for providing said receiver means with a number of different scan rates respectively associated with the time zones of the standby period so as to allow said receiver means to scan incoming signals with a particular scan rate associated with the current time zone of said time zones which said receiver means is currently operating in.

* * * * *